US011691885B2

(12) United States Patent
Omokawa et al.

(10) Patent No.: US 11,691,885 B2
(45) Date of Patent: Jul. 4, 2023

(54) HYDROPHOBIC SILICA POWDER

(71) Applicant: FUSO CHEMICAL CO., LTD., Osaka (JP)

(72) Inventors: Kazui Omokawa, Fukuchiyama (JP); Hirokazu Yokota, Kawasaki (JP); Kenichi Takeuchi, Fukuchiyama (JP); Yuma Negishi, Fukuchiyama (JP); Tomoko Kiseki, Fukuchiyama (JP); Munenori Komoto, Fukuchiyama (JP)

(73) Assignee: FUSO CHEMICAL CO., LTD., Osaka (JP)

( * ) Notice: Subject to any disclaimer, the term of this patent is extended or adjusted under 35 U.S.C. 154(b) by 612 days.

(21) Appl. No.: 16/644,583

(22) PCT Filed: Sep. 5, 2018

(86) PCT No.: PCT/JP2018/032938
§ 371 (c)(1),
(2) Date: Mar. 5, 2020

(87) PCT Pub. No.: WO2019/049907
PCT Pub. Date: Mar. 14, 2019

(65) Prior Publication Data
US 2021/0061667 A1 Mar. 4, 2021

(30) Foreign Application Priority Data

Sep. 7, 2017 (JP) .............................. JP2017-172113

(51) Int. Cl.
*C01B 33/159* (2006.01)
*C01B 33/152* (2006.01)
*G03G 9/097* (2006.01)

(52) U.S. Cl.
CPC .......... *C01B 33/159* (2013.01); *C01B 33/152* (2013.01); *G03G 9/09725* (2013.01); *C01P 2002/86* (2013.01); *C01P 2006/82* (2013.01)

(58) Field of Classification Search
CPC ..... C01B 33/159; C01B 33/152; C01B 33/18; G03G 9/09725; G03G 9/09716; G03G 9/08; G03G 9/097; C01P 2002/86; C01P 2006/82
See application file for complete search history.

(56) References Cited

U.S. PATENT DOCUMENTS

| | | | | |
|---|---|---|---|---|
| 2,663,650 A * | 12/1953 | Iler | .......................... | C08K 9/04 106/491 |
| 3,024,126 A * | 3/1962 | Brown | .................... | C04B 35/14 106/490 |
| 4,845,004 A * | 7/1989 | Kobayashi | ......... | G03G 9/09716 430/108.7 |
| 5,486,420 A * | 1/1996 | Nishihara | ............. | C09C 1/3081 428/407 |
| 2003/0103890 A1* | 6/2003 | Konya | ................... | B82Y 30/00 423/335 |
| 2006/0171872 A1* | 8/2006 | Adams | ................... | B82Y 30/00 430/108.7 |
| 2008/0069753 A1* | 3/2008 | Floess | ................... | C09C 1/3081 423/335 |
| 2011/0163262 A1 | 7/2011 | Higuchi et al. | | |
| 2012/0308824 A1 | 12/2012 | Matsukubo et al. | | |
| 2016/0130425 A1 | 5/2016 | Yoshitake et al. | | |
| 2016/0319077 A1 | 11/2016 | Ishizu et al. | | |

FOREIGN PATENT DOCUMENTS

| | | | | |
|---|---|---|---|---|
| CN | 102686207 A | 9/2012 | | |
| CN | 105308123 A | 2/2016 | | |
| CN | 105555839 A | 5/2016 | | |
| CN | 105849156 A | 8/2016 | | |
| EP | 2537804 B1 * | 3/2017 | ............ | C01B 13/36 |
| JP | 8-259216 A | 10/1996 | | |
| JP | 2006-96641 A | 4/2006 | | |
| JP | 2006-308642 A | 11/2006 | | |
| JP | 2011-173779 A | 9/2011 | | |
| JP | 2014-196226 A | 10/2014 | | |
| WO | 2010/035613 A1 | 4/2010 | | |
| WO | 2011/076518 A1 | 6/2011 | | |
| WO | 2015/003978 A1 | 1/2015 | | |

OTHER PUBLICATIONS

International Search Report dated Nov. 6, 2018, issued in counterpart International Application No. PCT/JP2018/032938 (2 pages).
Office Action dated Sep. 5, 2022, issued in counterpart CN application No. 201880057542.9, with English translation. (16 pages).

* cited by examiner

Primary Examiner — Anthony J Zimmer
(74) Attorney, Agent, or Firm — WHDA, LLP

(57) ABSTRACT

Provided is a hydrophobic silica powder that can be obtained by the sol-gel process, and that is excellent in charge properties. The hydrophobic silica powder has a hydrophobicity of 50% or more, a saturated water content of 4% or less, and a nitrogen content of 0.05% or more.

4 Claims, No Drawings

HYDROPHOBIC SILICA POWDER

TECHNICAL FIELD

The present invention relates to a hydrophobic silica powder.

BACKGROUND ART

Inorganic-oxide fine particles have a variety of applications. In particular, hydrophobic silica powder is used as a main component or an additive component (e.g., an external additive) in a variety of fields, such as cosmetics, rubber, and abrasives, for the purpose of, for example, increasing strength and powder flowability, and imparting charge properties.

An example of the applications is the use of hydrophobic silica powder as an external additive for toner resin particles for printing. Toner resin particles are composed of a binder resin, a pigment, a charge adjuster, wax, an external additive, etc. The external additive plays an important role on the surface of the toner resin particles in controlling the charge properties, flowability, antiblocking properties, and the like of the toner.

Hydrophobic silica powder for use as an external additive must have excellent charge properties. Decreasing the water content in hydrophobic silica powder is known to be effective in increasing the charge properties of hydrophobic silica powder.

Hydrophobic silica powder produced by the sol-gel process is suggested as hydrophobic silica powder with charge properties. However, because the sol-gel process typically performs synthesis at a low temperature of around 0 to 40° C., the resulting silica powder tends to have a low absolute specific gravity, and have a high water content when formed into powder. Thus, such silica powder externally added to, for example, toner resin particles, exhibits insufficient charge levels.

PTL 1 and 2 disclose fumed silica. Fumed silica is hydrophobic silica powder typically obtained by calcinating silica at a high temperature of about 1000° C. Performing treatment at high temperatures enables hydrophobic silica powder to have a low water content, and also provides hydrophobic silica powder with excellent charge properties. However, it is difficult to control the shape of the particles of fumed silica; therefore, the dispersion state deteriorates, increasing the likelihood of generating aggregates between particles. Aggregates between particles of hydrophobic silica powder are undesirable in processing toner resin particles.

As noted above, there is demand for hydrophobic silica powder that is obtained by the sol-gel process by which aggregates between particles of hydrophobic silica powder are less likely to be generated; and that has excellent charge properties.

CITATION LIST

Patent Literature

PTL 1: JP2011-173779A
PTL 2: JP2014-196226A

SUMMARY OF INVENTION

Technical Problem

In view of such circumstances in the art, an object of the present invention is to provide a hydrophobic silica powder that is obtained by the sol-gel process, and that has excellent charge properties.

Solution to Problem

The present inventors conducted extensive research to achieve the object, and found that preparing hydrophobic silica powder that satisfies a predetermined hydrophobicity, saturated water content, and nitrogen content by the sol-gel process results in hydrophobic silica powder with excellent charge properties. The present inventors conducted further research on the basis of these findings, and completed the invention.

Specifically, the present invention provides the following hydrophobic silica powders.
Item 1.
A hydrophobic silica powder that has a hydrophobicity of 50% or more, a saturated water content of 4% or less, and a nitrogen content of 0.05% or more.
Item 2.
The hydrophobic silica powder according to Item 1, wherein a peak derived from structure Q4 is present in an amount of 40% or more based on the total peaks derived from structure Q2, structure Q3, and structure Q4 in terms of peak intensity ratio in a $^{29}$Si solid-state NMR spectrum.
Item 3.
The hydrophobic silica powder according to Item 1 or 2, wherein a peak derived from structure M is present in a $^{29}$Si solid-state NMR spectrum.
Item 4.
The hydrophobic silica powder according to any one of Items 1 to 3, comprising an amine having a boiling point of 100° C. or more in an amount of 0.1% or more.
Item 5.
A toner resin particle having the hydrophobic silica powder according to any one of Items 1 to 4 externally added thereto.

Advantageous Effects of Invention

The present invention can provide a hydrophobic silica powder with excellent charge properties by the sol-gel process.

DESCRIPTION OF EMBODIMENTS

Hydrophobic Silica Powder
The hydrophobic silica powder according to the present invention has a hydrophobicity of 50% or more, a saturated water content of 4% or less, and a nitrogen content of 0.05% or more.

The hydrophobicity of the hydrophobic silica powder according to the present invention is 50% or more. A hydrophobicity of less than 50% may result in failure to impart sufficient charge properties to toner resin particles, described later. The hydrophobicity is preferably 55% or more, and more preferably 60% or more. A higher hydrophobicity is better, and the upper limit is not particularly limited. The upper limit is preferably 100% or less, more preferably 98% or less, and still more preferably 95% or less.

In the present specification, hydrophobicity is measured by the following method. Specifically, 50 mL of pure water is placed in a 200-mL beaker, and 0.2 g of hydrophobic silica powder is added thereto, followed by stirring the mixture with a magnet stirrer, thereby preparing a dispersion of a hydrophobic silica powder. The tip of a burette containing methanol is inserted into the dispersion, and methanol is added dropwise with stirring. The amount of methanol required to completely disperse the hydrophobic silica powder in water is measured, and determined to be Y mL. The hydrophobicity is then calculated using the following equation.

[hydrophobicity (%)]=[Y/(50+Y)]×100

The hydrophobic silica powder according to the present invention has a saturated water content of 4% or less. A saturated water content of more than 4% may result in failure to impart sufficient charge properties to toner resin particles, described later. From the standpoint of imparting excellent charge properties to toner resin particles, a saturated water content of 2% or less is more preferable. The lower limit of the saturated water content is not particularly limited, and is preferably about 0.01%.

The saturated water content of the hydrophobic silica powder according to the present invention is measured by the following method. Specifically, hydrophobic silica powder is dried in a vacuum for 2 hours; and 2 g of the vacuum-dried hydrophobic silica powder is precisely weighed and placed in a Petri dish, followed by pretreatment at 60° C. and 80% RH for 48 hours. Subsequently, titration is performed for 10 minutes with an ADP-611 moisture vaporizer (Kyoto Electronics Manufacturing Co., Ltd.) and a MKV-710 Karl Fischer moisture meter (Kyoto Electronics Manufacturing Co., Ltd.), and the average of two measurements is determined to be the saturated water content.

The hydrophobic silica powder according to the present invention has a nitrogen content of 0.05% or more. In the present specification, hydrophobic silica powder having a nitrogen content of 0.05% or more means that the nitrogen content determined by performing an elemental analysis of (hydrophobic) silica powder is 0.05% or more. A hydrophobic silica powder that has a nitrogen content of less than 0.05% result in failure to obtain a hydrophobic silica powder, which has excellent charge properties, by the sol gel process.

The nitrogen content of the hydrophobic silica powder according to the present invention is measured by the following method. Specifically, measurement by elemental analysis with a Sumigraph NCH-22F (Sumika Chemical Analysis Service, Ltd.) is performed under the following conditions.

Oxygen circulating combustion
TCD detection method
NCH quantification device
Reaction temperature: 850° C.
Reduction temperature: 600° C.
Separation/detection: a column packed with porous polymer beads/TCD
Reference sample: a reference sample for element quantification acetanilide The peak derived from structure Q4 of the hydrophobic silica powder is present preferably in an amount of 40% or more, and more preferably 50% or more, based on the total peaks derived from structure Q2, structure Q3, and structure Q4 in terms of peak intensity ratio in a $^{29}$Si solid-state NMR spectrum. A peak derived from structure Q4 present in an amount of 40% or more in terms of peak intensity ratio makes the structure of silica particles dense, thus decreasing the saturated water content. The upper limit of the intensity ratio of the peak derived from structure Q4 is preferably 70%, and more preferably 60%. With such upper limits, a hydrophobic silica powder with a low water content can be obtained without performing calcination at a high temperature of about 1000° C., as in the case of fumed silica. This results in a hydrophobic silica powder that even has excellent charge properties, while exhibiting the feature of sol-gel silica such that aggregates between particles of hydrophobic silica powder are less likely to be generated.

The peaks derived from structure Q2, structure Q3, and structure Q4 in a $^{29}$Si solid-state NMR spectrum are represented by peaks whose middle value in the chemical shift falls within the range of −90 to −93 ppm, −100 to −102 ppm, and −110 to −112 ppm, respectively.

The hydrophobic silica powder preferably has a peak derived from structure M in a $^{29}$Si solid-state NMR spectrum. More specifically, the surface of the hydrophobic silica powder is preferably modified by a trimethylsilyl group that has structure M. Due to such a structure, the hydrophobic silica powder can have excellent hydrophobicity. This enables toner resin particles to which the hydrophobic silica powder is externally added to have excellent charge properties.

The peak derived from structure M in a $^{29}$Si solid-state NMR spectrum can be represented by peak whose middle value in the chemical shift falls within the range of 15 to 10 ppm. The intensity of the peak derived from structure M is preferably present in an amount of 1% or more based on the total intensity of the peaks of structure Q2, structure Q3, and structure Q4.

The hydrophobic silica powder preferably contains an amine that has a boiling point of 100° C. or more in an amount of 0.1% or more. The amine can be selected from a wide range of known amine compounds that have a boiling point of 100° C. or more, and there is no particular limitation thereto. Specifically, the amine includes ethylenediamine, diethylenetriamine, triethylenetetramine, tetraethylenepentamine, monoethanolamine, diethanolamine, triethanolamine, 3-ethoxypropylamine, bis(2-aminoethyl)amine, tetramethylammonium hydroxide (TMAH), tetraethylammonium hydroxide, tetrapropylammonium hydroxide, and tetramethylguanidine. Due to such a structure, a hydrophobic silica powder with a low water content can be obtained, and this leads to excellent charge properties of toner resin particles produced by externally adding the hydrophobic silica powder. The amine content in the hydrophobic silica powder can be quantified by dissolving the silica, extracting the amine by solvent extraction, and performing an analysis by, for example, ion chromatography.

The size of the hydrophobic silica powder can be any size. For example, the volume average particle size D50v is preferably 30 nm or more and 300 nm or less, more preferably 50 nm or more and 250 nm or less, and still more preferably 60 nm or more and 200 nm or less. A volume average particle size D50v of 30 nm or more can impart excellent heat-resistance stability to toner resin particles, while a volume average particle size D50v of 300 nm or less can impart excellent charge properties to toner resin particles.

In the present specification, the volume average particle size D50v refers to 50% size (D50v) in cumulative frequency of an equivalent circle diameter determined by observing 100 or more primary particles in a hydrophobic silica powder with a scanning electron microscope (SEM JEOL Ltd.: JSM-6700) at 200,000-fold magnification, and performing an image analysis of secondary particles.

The hydrophobic silica powder according to the present invention preferably has a ratio of the degree of penetration d (mm) measured by the following degree of penetration measurement method to the volume average particle size D50v (nm) (d/D50v) of 2.4 or more, and more preferably 3 or more. A ratio d/D50v within these numerical ranges enables the hydrophobic silica powder according to the present invention to more sufficiently impart heat-resistance stability to resin particles, even when the particle size is small. The upper limit of d/D50v can be any value, and may be about 4.

Degree of Penetration Measurement Method (1) Two parts by mass of hydrophobic silica powder is externally added to 100 parts by mass of resin particles.
(2) The mixture is heated at 55° C. and 80% RH for 24 hours.
(3) The heated product is then cooled at 24° C. for 2 hours, followed by measuring the degree of penetration d.

The hydrophobic silica powder according to the present invention may contain silica secondary particles with a twisted and/or branched structure. The silica particles with a twisted and/or branched structure are calculated as the ratio of the number of counted twisted/branched particles to the total number of particles by observing 100 or more secondary particles of the obtained hydrophobic silica powder with a scanning electron microscope (SEM). The twisted structure refers to at least 3 particles bound to each other in a line, but not in a straight line. The branched structure refers to at least 4 particles that are bound to each other, but not in a line (branched).

The silica secondary particles with a twisted and/or branched structure are preferably those obtained from alkyl silicate as a starting material. The alkyl silicate as a starting material is preferably tetramethyl orthosilicate (TMOS).

When the hydrophobic silica powder according to the present invention contains silica secondary particles with a twisted structure and/or branched structure, the content of such silica secondary particles is preferably 20% or more, more preferably 25% or more, and still more preferably 30% or more of the number of particles in a visual field observed with a scanning electron microscope (SEM) at 200,000-fold magnification. A content of 20% or more can impart excellent heat-resistance stability and charge properties to resin particles. The upper limit of the content can be any value, but is preferably about 50%.

The average of the aspect ratios (average aspect ratio) of silica secondary particles with a twisted structure and/or branched structure in the visual field is preferably 1.5 or more, and less than 5. An average aspect ratio of more than 5 may make it difficult to handle the hydrophobic silica powder due to, for example, increased viscosity; and may lead to gelatinization of the hydrophobic silica powder.

The silica secondary particles with a twisted and/or branched structure preferably contains 1) sodium, 2) an alkali earth metal selected from the group consisting of calcium and magnesium, and 3) a heavy metal selected from the group consisting of iron, titanium, nickel, chromium, copper, zinc, lead, silver, manganese, and cobalt, respectively in an amount of 1 ppm by mass or less. More preferably, the content of sodium, the content of an alkali earth metal, and the content of a heavy metal are each preferably 1 ppm by mass or less. In the present invention, the heavy metal refers to a metal element with a density of 4 g/cm$^3$ or more. The content of an alkali earth metal and the content of a heavy metal each refer to the content of the individual metal element.

The toner resin particles prepared using the hydrophobic silica powder according to the present invention as an external additive have excellent charge properties. The toner resin particles according to the present invention can be produced by combining a known binder resin, pigment, charge adjuster, wax, etc.

Method for Producing Hydrophobic Silica Powder

The method for producing the hydrophobic silica powder according to the present invention can be any method, and examples include the following method comprising (1) step I of preparing colloidal silica containing silica secondary particles,
(2) step II of hydrophobizing the colloidal silica, thereby preparing hydrophobized colloidal silica, and
(3) step III of drying and pulverizing the hydrophobized colloidal silica, thereby forming the hydrophobized silica into powder. Below, this production method is explained.

Step I

Step I is a step of preparing colloidal silica containing silica secondary particles.

The silica secondary particles are preferably produced from an alkyl silicate, which can be highly purified by distillation purification, as a silica starting material. More preferably, a silica starting material for use can be tetramethyl orthosilicate (TMOS), which can be highly purified and is highly reactive, and can even be easily hydrolyzed at room temperature in the absence of a catalyst.

More specifically, step I preferably includes the following steps.

1) step i of preparing an alkaline mother liquor containing an alkaline catalyst and water, and
2) step ii of adding an alkyl silicate or a hydrolysis liquid obtained by hydrolyzing an alkyl silicate to the mother liquor.

Step ii of adding the hydrolysis liquid to the mother liquor can be performed by a known method. For example, step ii can be performed by the method disclosed in WO2008/123373. Preferably, step ii may include the following steps in this order:

A) step 1 of adding an alkyl silicate or the hydrolysis liquid until the pH of the mixture becomes less than 7;
B) step 2 of adding an aqueous-alkaline solution until the pH of the mixture becomes 7 or more, and
C) step 3 of adding an alkyl silicate or the hydrolysis liquid while maintaining the pH of the mixture at 7 or more.

More details are described below.

Step i: Mother Liquor Preparation Step

In the mother liquor preparation step, a mother liquor containing an alkaline catalyst and water is prepared. For example, a mother liquor may be prepared by adding an alkaline catalyst to water.

The alkaline catalyst for use may be a known alkaline catalyst. From the standpoint of particularly avoiding contamination with metallic impurities, an organic base catalyst free of a metallic component is suitable. Of organic base catalysts, a nitrogen-containing organic base catalyst is preferable. Examples of such an organic base catalyst include nitrogen-containing organic base catalysts, such as ethylenediamine, diethylenetriamine, triethylenetetramine, ammonia, urea, monoethanolamine, diethanolamine, triethanolamine, tetramethylammonium hydroxide (TMAH), and tetramethylguanidine.

In particular, a less-volatile organic base catalyst that is not volatilized within the temperature range (heating) of the adding step is preferable. Because less-volatile alkaline catalysts are highly heat resistant, the step of adding an alkyl silicate or a hydrolysis liquid obtained by hydrolyzing an alkyl silicate to a mother liquor can be performed at high temperatures. This enables the hydrophobic silica powder (final target product) to have a dense structure, thus reducing water retention. As a result, toner resin particles for which the hydrophobic silica powder is used as an external additive can have excellent charge properties.

Specific examples of less-volatile organic base catalysts include amine-based catalysts, such as 3-ethoxypropylamine, ethylenediamine, diethylenetriamine, triethylenetetramine, tetraethylenepentamine, monoethanolamine, diethanolamine, triethanolamine, bis(2-aminoethyl)amine, and tetramethylguanidine; and quaternary ammonium salts, such as tetramethylammonium hydroxide, tetraethylammonium hydroxide, and tetrapropylammonium hydroxide.

However, if a volatile base is used, the pH of the system may be maintained by continuously adding the base.

The alkaline catalysts may be used singly, or in a combination of two or more. The amount of an alkaline catalyst is preferably set such that the pH of the mother liquor typically falls within 7 to 14, more preferably 9 to 12, and still more preferably 9 to 11.

A small amount of an alkaline catalyst leads to a small size of the particles generated during the transition to acidic conditions; thus, even if the particles are aggregated in acidic conditions, sufficient deformation may not be achieved. In other words, an overly small particle size may loosen the deformed shape during the particle-growing process. A large amount of an alkaline catalyst leads to a large size of the particles generated during the transition to acidic conditions; thus, it becomes difficult for aggregations to occur in acidic conditions, and sufficient deformed particles may not be obtained.

When an alkyl silicate or a hydrolysis liquid of an alkyl silicate, described later, is added, the mother liquor is preferably heated. In particular, it is preferable to create water reflux by heating the mother liquor. Reflux can be performed by using a known device. The reaction temperature is preferably 70 to 130° C., more preferably 80 to 120° C., and still more preferably 90 to 120° C. Performing a reaction at a temperature within these ranges results in dense particles.

These temperature ranges can be achieved by using an alkaline catalyst for use in producing the hydrophobic silica powder according to the present invention, in particular a nitrogen-containing organic base catalyst (e.g., 3-ethoxypropylamine and tetramethylammonium hydroxide). These temperature ranges are higher than the reaction temperature at which silica powder is produced by the sol-gel process, which is a standard method. Thus, the water content in the silica powder can be reduced.

The addition step may be performed under increased pressure so that reflux can be performed at a higher temperature. In this case, a known device, such as an autoclave, can be used.

Step ii: Addition Step

In the addition step, an alkyl silicate (preferably tetramethyl orthosilicate) or a hydrolysis liquid of an alkyl silicate (simply "hydrolysis liquid" below) is added to the mother liquor.

The hydrolysis liquid is prepared by hydrolyzing an alkyl silicate with pure water. Specifically, when tetramethyl orthosilicate is used as an alkyl silicate, 1 equivalent or more of water relative to the methoxy groups is added to perform the following reaction, thereby preparing an active alkyl silicate solution.

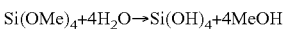

$$Si(OMe)_4 + 4H_2O \rightarrow Si(OH)_4 + 4MeOH$$

wherein Me represents a methyl group.

The hydrolysis liquid of an alkyl silicate can be prepared by a known method. For example, a hydrolysis liquid is prepared by adding an alkyl silicate to water, and stirring the mixture. In the thus-obtained reaction mixture, hydrolysis proceeds in about 1 to 2 hours, thereby giving a predetermined hydrolysis liquid.

When hydrolyzed, an alkyl silicate becomes a non-volatile silicic acid oligomer, which can undergo a particle growth reaction at a higher temperature. Thus, hydrolyzing an alkyl silicate is advantageous in preparing denser particles.

The amount of an alkyl silicate added to water is determined such that the ultimately obtained hydrolysis liquid has a silica concentration of typically 1 to 20 mass %, and preferably 1 to 10 mass %. This enables silica particles to efficiently grow, while preventing gelatinization of the alkyl silicate hydrolysis liquid.

In the production method described above, a water-soluble organic solvent as a compatibilizing solvent, in place of a portion of water, may be optionally added to the reaction mixture in order to make the alkyl silicate compatible with water. An example of the water-soluble organic solvent is an alcohol. Specific examples include lower alcohols, such as methanol, ethanol, and isopropanol (in particular, alcohols having 1 to 3 carbon atoms). The content of the water-soluble organic solvent can be any content; typically, the content may be about 0 to 90 mass %, and preferably about 0 to 50 mass % of the reaction mixture.

Because the alkyl silicate hydrolysis liquid has poor preservability, the alkyl silicate hydrolysis liquid may be prepared every 2 to 10 hours according to the solids concentration; or supply of the hydrolysis liquid may be continued, while continuously preparing the hydrolysis liquid. Because preservability is improved by adding the compatibilizing solvent, the amount of the compatibilizing solvent may be determined while taking this point into consideration. Additionally, the hydrolysis liquid becomes more stable as the storage temperature becomes lower. Thus, it may be effective to cool the hydrolysis liquid after preparation of the liquid, to the degree that the liquid does not become frozen.

In the production method above, hydrolysis may be performed in the presence of a catalyst, or in the absence of a catalyst. When a catalyst is used, an inorganic acid or organic acid, such as sulfuric acid, hydrochloric acid, nitric acid, and acetic acid; or a solid acid, such as a strongly acidic cation-exchange resin, may be used as an acid catalyst. In the present invention, particularly from the standpoint of avoiding contamination with anion impurities, such as $Cl^-$, $NO_3^-$, and $SO_4^{2-}$, hydrolysis is preferably performed in the absence of a catalyst.

In particular, tetramethyl orthosilicate (TMOS) is easily hydrolyzed at room temperature in the absence of a catalyst; thus, the use of tetramethyl orthosilicate can reduce the amount of these corrosive anion impurities to less than 1 ppm.

In the production method described above, step ii (addition step) may include the following steps in this order:
A) step 1 of adding an alkyl silicate or the hydrolysis liquid until the pH of the mixture becomes less than 7;

B) step 2 of adding an aqueous-alkaline solution until the pH of the mixture becomes 7 or more; and C) step 3 of adding an alkyl silicate or the hydrolysis liquid, while maintaining the pH of the mixture at 7 or more.

Specifically, after the hydrolysis liquid is added to the alkaline mother liquor to make the pH of the mixture less than 7 (acidic range), the aqueous-alkaline solution is added to return the pH of the mixture to 7 or more; thereafter, while maintaining the pH at 7 or more (i.e., while adding the aqueous-alkaline solution), the addition of the hydrolysis liquid is continued. When this procedure is performed, it is preferable to stop adding the hydrolysis liquid, or to add the hydrolysis liquid in a small amount in the step of adding the aqueous-alkaline solution in order to return the pH of the mixture to 7 or more (step 2). Below, each step is described.

In step 1, it is preferable to add an alkyl silicate or the hydrolysis liquid until the pH of the mixture becomes less than 7. Although the lower limit of the pH is not limited, the pH is preferably 6 or more from the standpoint of reducing excessive gelatinization of the mixture. Specifically, in step 1, it is preferable to adjust the pH of the mixture to 6 or more and less than 7, more preferably 6.3 or more and less than 7. An overly lowered pH would increase the degree of deformation, but may lead to decreased filterability, increased viscosity, and gelatinization.

In the production method described above, it appears that seed particles are first generated in the mother liquor composed of water and an alkaline catalyst, after which growth of particles begins. Because the number of generated seed particles is determined by the amount of the initially added alkyl silicate or hydrolysis liquid of the alkyl silicate (concentration), the ratio of the amount of the mother liquor added in step 1 to the addition speed of the hydrolysis liquid of the alkyl silicate serves as a parameter. The addition speed of the alkyl silicate or hydrolysis liquid varies depending on the concentration of the hydrolysis liquid, the desired particle size of colloid particles, etc.; however, the addition speed may be a speed sufficient to form dense silica particles. The addition speed is preferably 0.7 to 41 g silica/hour/kg mother liquor. The "g silica" as used here refers to the weight of silica, and "kg mother liquor" refers to the weight of the mother liquor. When the addition speed is fast, the number of generated seed particles increases, which leads to acidification of particles in a smaller size. Thus, it increases the degree of deformation, but makes it difficult to control the pH. An overly small particle size, as stated above, may loosen the deformed shape during the particle-growing process. Conversely, a slow addition speed decreases the number of generated seed particles, and causes the particles to be acidified in a larger size. Thus, it decreases the degree of deformation, but makes it easier to control the pH. The addition speed in step 1 may be determined while taking these points into consideration.

Step 2 is a step of adding an aqueous-alkaline solution until the pH of the mixture becomes 7 or more. Examples of the aqueous-alkaline solution for use include alkali metal hydroxides; and organic amines, which do not easily volatilize at the boiling point of water. It is preferable to avoid NaOH, LiCH, etc., which are a source of contamination; specifically, TMAH is preferable. It is preferable to perform the operations in steps 1 and 2 such that the time period during which the pH of the mixture stays at less than 7 is 0.5 to 5 hours. In step 2, an alkyl silicate or a hydrolysis liquid may not be added. Specifically, an alkyl silicate or a hydrolysis liquid is added in step 1 to decrease the pH to a predetermined pH, and addition is ended. During a predetermined time period, a pH within the acidic range is maintained to allow seed particles to become aggregated. Subsequently, an aqueous-alkaline solution is added to return the pH to the alkali range. The aqueous-alkaline solution may be added gradually, or at one time.

Step 3 is a step of adding an alkyl silicate or the hydrolysis liquid while maintaining the pH of the mixture at 7 or more. Here, the addition of an alkyl silicate or the hydrolysis liquid is resumed, while preferably adding an aqueous-alkaline solution. The addition speed at which an alkyl silicate or the hydrolysis liquid is added is preferably 0.7 to 41 g silica/hour/kg mother liquor. The addition of an alkyl silicate or the hydrolysis liquid to the mother liquor is continued until the particles grow to colloid particles of a desired particle size. Growth of the particles results in colloidal silica containing silica secondary particles that have a twisted structure and/or a branched structure according to the present invention. An overly fast addition speed may lead to remaining silanol groups, and allows particles to grow while not becoming dense. This increases the number of remaining silanol groups, thus possibly increasing the $^{29}$SiCP/MASNMR peak area value. Additionally, precipitates on the surface of particles cannot be completed in time, which allows new fine particles to form. This widens the particle size distribution, and may increase the CV value calculated by the following formula (1), or allow the entire system to be gelatinized.

$$CV=(SD/D)\times 100 \tag{1}$$

wherein SD represents a standard deviation, and D represents a mean particle size.

After generation of colloid particles of a predetermined particle size, addition of an alkyl silicate or the hydrolysis liquid is ended. The alcohol remaining in the reaction mixture may optionally be removed, for example, by distillation. In this case, decreases in reaction temperature can be avoided by continuously removing the water-soluble organic solvent (e.g., an alcohol). Additionally, because the presence of a large amount of the water-soluble organic solvent (e.g., an alcohol) in the addition step leads to a phenomenon of disturbed precipitation of silica (e.g., the alkyl silicate is dissolved in the solvent), it is preferable to promptly distill off the excessive water-soluble organic solvent (e.g., an alcohol) outside the system. Distilling off the solvent can also allow the concentration described later to proceed simultaneously. When the reaction has ended, the system can be concentrated to a solids concentration of 25% or more.

Subsequently, the reaction mixture is optionally concentrated. Before concentrating the reaction mixture, a trace amount of the water-soluble organic solvent (e.g., an alcohol) remaining in the system can also be optionally removed beforehand.

When the reaction mixture is concentrated, the following are first confirmed: the temperature (the temperature of the system) has reached 100° C.; the steam temperature has also reached 100° C.; and removal of the water-soluble organic solvent has ended. The system is then concentrated to a predetermined solids concentration. The concentration method for use can be a known concentration method, such as distillation concentration and membrane concentration. The concentrate can be filtered through a predetermined filter to remove coarse particles, foreign matter, etc., and then used as is in a range of applications.

Step I described above prepares colloidal silica containing silica secondary particles.

Step II

Step II is a step of hydrophobizing the colloidal silica, thereby preparing hydrophobized colloidal silica.

The method for hydrophobizing the colloidal silica includes the method in which an organosilazane is added to the colloidal silica prepared in step I, and the mixture is heated.

The organosilazane can be any organosilazane, and a known organosilazane may be used. Specifically, organosilazanes include tetramethyl disilazane, hexamethyldisilazane, and pentamethyl disilazane. Of these, from the standpoint of industrial availability, hexamethyldisilazane is preferable.

These organosilazanes may be used singly, or in a combination of two or more. In order to make the organosilazane and colloidal silica compatible, a water-soluble organic solvent (a compatibilizing solvent) in place of a portion of water may optionally be added to the reaction mixture. Examples of the water-soluble organic solvent include methanol, ethanol, isopropanol, and acetone. The content of the water-soluble organic solvent can be any content; typically, the content of the water-soluble organic solvent may be about 0.1 to 50 mass %, and preferably about 0.5 to 30 mass %, based on the reaction mixture.

The amount of the organosilazane added can be any amount; and is preferably 5 to 15 parts by mass, and more preferably 7 to 13 parts by mass, per 100 parts by mass of the colloidal silica obtained in step I.

The heating temperature can be any temperature; and is preferably 45° C. or higher, more preferably 50° C. or higher, and still more preferably 60° C. or higher. The upper limit of the heating temperature can be any temperature, and is preferably 90° C. or lower.

The heating time in step II can be any time period; and is preferably 10 to 300 minutes, and more preferably 30 to 240 minutes.

Step III

Step III is a step of drying and pulverizing the hydrophobized colloidal silica, thereby forming the hydrophobized colloidal silica into powder.

The method for drying the hydrophobized colloidal silica can be any method, and the hydrophobized colloidal silica may be dried by a known drying method. Examples of such a drying method include a method in which heating is performed with a dryer at a temperature of 100 to 130° C. for 180 to 480 minutes.

The method for pulverizing the dried colloidal silica can be any method, and the dried colloidal silica may be pulverized with a known pulverization method. Examples of such a pulverization method include a jet mill.

Step III described above dries and pulverizes the hydrophobized colloidal silica; and forms it into powder, thereby producing a hydrophobic silica powder.

Toner Resin Particles

The toner resin particles according to the present invention are those formed such that the hydrophobic silica powder is externally added to resin particles.

The resin particles for use in forming toner resin particles may be known resin particles used in toner resin particles. Examples of such resin particles include polyester resin particles, and vinyl resin particles. Of these, polyester resin particles are preferable.

The glass-transition temperature (Tg) of polyester resin is preferably 40° C. or higher, and 80° C. or lower. A glass-transition temperature within this numerical range makes it easier to maintain a low-fusing temperature.

The polyester resin preferably has a weight average molecular weight (Mw) of 5,000 or more, and 40,000 or less. The polyester resin also preferably has a number average molecular weight (Mn) of 2,000 or more, and 10,000 or less.

The method for externally adding a hydrophobic silica powder to resin particles can be any method, and a hydrophobic silica powder can be externally added by a known method. Examples of such a method include an external addition method using a "surface-modifying machine," which is a typical powder mixer, such as a Henschel mixer, a V-blender, a Lödige mixer, and a hybridizer. The external addition may be performed such that a hydrophobic silica powder is adhered onto the surface of resin particles, or such that part of the hydrophobic silica powder is embedded in resin particles.

The amount of the hydrophobic silica powder according to the present invention for use as an external additive is preferably 0.01 to 5.00 parts by mass, and more preferably 1.00 to 3.00 parts by mass, per 100 parts by mass of the components other than external additives of the toner resin particles.

The volume average particle size (D50v) of the toner resin particles according to the present invention is preferably 2 µm or more, and 10 µm or less; and more preferably 4 µm or more, and 8 µm or less. A volume average particle size of 2 µm or more leads to excellent flowability of the toner, and enables the carrier to impart sufficient charge properties to the particles. A volume average particle size of 10 µm or less results in a high-quality image.

The charge level of the toner resin particles according to the present invention is preferably 18 µC/g or more, and more preferably 20 µC/g or more. A charge level within these numerical ranges leads to further improved charge properties of the toner resin particles according to the present invention. The upper limit of the charge level is not particularly limited; the upper limit may be about 50 µC/g.

In the present specification, the charge level refers to a value obtained by the following measurement method. Specifically, a hydrophobic silica powder is externally added to resin particles such that the ratio of the resin particles to the hydrophobic silica powder is 100:2 (mass ratio), thereby preparing toner resin particles. 10 g of the toner resin particles are weighed and placed in a 100-mL IBOY wide-mouth bottle (a polypropylene bottle with a volume of 100 mL), and subjected to pretreatment at 23° C. and 53% RH for 24 hours. Subsequently, the charge level is measured three times in a room adjusted to 20 to 25° C. and 50 to 60% RH with a suction-type Faraday cage (Trek Japan, Model 212HS), and the average is determined as the charge level.

Although embodiments of the present invention are described above, the present invention is not limited to these embodiments. The present invention with various modifications may be performed without departing from the spirit and principal concept of the invention.

EXAMPLES

Below, embodiments of the present invention are described in more detail with reference to Examples. However, the present invention is not limited to these Examples.

Example 1

7500 g of pure water and 1.35 g of 3-ethoxypropylamine were heated to 85° C. with stirring. Subsequently, 2740 g of tetramethyl orthosilicate was added thereto over 1 hour, and continuously stirred for 15 minutes. Thereafter, 50.13 g of 3-ethoxypropylamine was added; and then 23127 g of pure water was added, followed by heating the mixture to 80° C. with stirring. 7363 g of tetramethyl orthosilicate was further added over 3 hours, thereby preparing colloidal silica 1.

The prepared colloidal silica 1 was heated at 98° C. to concentrate it to a silica concentration of 20%, thereby preparing a concentrated liquid of colloidal silica. 0.3 g of acetic acid and 100 g of hexamethyldisilazane were added to 1000 g of the concentrated liquid of colloidal silica, and stirred. The temperature was increased from room temperature to 80° C. over 2 hours; and the mixture was further heated at 80° C. for 3 hours, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Example 2

7500 g of pure water and 0.39 g of 3-ethoxypropylamine were heated to 85° C. with stirring. Subsequently, 2740 g of tetramethyl orthosilicate was added thereto over 2 hours, followed by continuously stirring for 30 minutes. Thereafter, 50.14 g of 3-ethoxypropylamine was added; and 23126 g of pure water was then added, followed by heating to 80° C. with stirring. 8598 g of tetramethyl orthosilicate was further added over 6 hours, thereby preparing colloidal silica 2.

The prepared colloidal silica was heated at 98° C. to concentrate it to a silica concentration of 20%, thereby preparing a concentrated liquid of colloidal silica. 0.3 g of acetic acid and 100 g of hexamethyldisilazane were added to 1000 g of the concentrated liquid of colloidal silica, and stirred. The temperature was increased from room temperature to 80° C. over 2 hours; and the mixture was further heated at 80° C. for 3 hours, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Example 3

6250 g of pure water and 0.32 g of 3-ethoxypropylamine were heated to 80° C. with stirring. Subsequently, 3729 g of tetramethyl orthosilicate was added thereto over 100 minutes, followed by continuously stirring for 15 minutes. Thereafter, 68.23 g of 3-ethoxypropylamine was added; and then 23013 g of pure water was added, followed by heating to 80° C. with stirring. 11759 g of tetramethyl orthosilicate was further added over 6 hours, thereby preparing colloidal silica 3.

The prepared colloidal silica 3 was heated at 98° C. to concentrate it to a silica concentration of 20%, thereby preparing a concentrated liquid of colloidal silica. 0.3 g of acetic acid and 100 g of hexamethyldisilazane were added to 1000 g of the concentrated liquid of colloidal silica, and stirred. The temperature was increased from room temperature to 80° C. over 2 hours; and the mixture was further heated at 80° C. for 3 hours, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Example 4

6250 g of pure water and 0.32 g of 3-ethoxypropylamine were heated to 80° C. with stirring. Subsequently, 3730 g of tetramethyl orthosilicate was added thereto over 2 hours, followed by adding a diluted amine solution prepared by diluting 68.01 g of 3-ethoxypropylamine with water to 20% over 30 minutes. Thereafter, 35101 g of pure water was added, and the mixture was heated to 80° C. with stirring. 11722 g of tetramethyl orthosilicate was further added over 6 hours, thereby preparing colloidal silica 4.

The prepared colloidal silica 4 was heated at 98° C. to concentrate it to a silica concentration of 20%, thereby preparing a concentrated liquid of colloidal silica. 0.3 g of acetic acid and 100 g of hexamethyldisilazane were added to 1000 g of the concentrated liquid of colloidal silica, and stirred. The temperature was increased from room temperature to 80° C. over 2 hours; and the mixture was further heated at 80° C. for 3 hours, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Example 5

518 g of tetramethyl orthosilicate was added dropwise to 1752 g of water adjusted to a temperature of 10° C. with stirring over 8 minutes. Stirring was further continued for 60 minutes, thereby preparing 2270 g of a 9% silicic acid aqueous solution.

Subsequently, 7000 g of pure water was separately prepared, and heated to 98° C. to the point of reflux. 2250 g of a 9% silicic acid aqueous solution prepared in the manner as described above was then added dropwise over 3 hours under reflux at a temperature of 98° C., and refluxed for 30 minutes. Subsequently, 22.5 g of 9.1% (normal) tetramethylammonium hydroxide was added dropwise, and refluxed for 30 minutes. Subsequently, 3700 g of the obtained sol was divided into small portions; and 5300 g of water was added thereto, followed by stirring and heating under reflux. 900 g of a 9% silicic acid aqueous solution was added dropwise over 3 hours, during which 2.14 g of a 9.1% tetramethylammonium hydroxide aqueous solution was added every one hour. The operation of adding the 9% silicic acid aqueous solution and the 9.1% tetramethylammonium hydroxide aqueous solution dropwise over 3 hours was repeated eight times, thereby preparing colloidal silica 6. The prepared colloidal silica 6 was heated at 98° C. to concentrate it to a silica concentration of 20%, thereby preparing a concentrated liquid of colloidal silica. 0.3 g of acetic acid and 100 g of hexamethyldisilazane were added to 1000 g of the concentrated liquid of colloidal silica, and stirred. The temperature was increased from room temperature to 80° C. over 2 hours; and the mixture was further heated at 80° C. for 1 hour, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Example 6

100 μL of acetic acid was added to 624 g of water adjusted to a temperature of 25° C. 51 g of tetramethyl orthosilicate was added thereto at one time with stirring. Stirring was continued for 60 minutes, thereby preparing 675 g of a 3% silicic acid aqueous solution.

Subsequently, 1000 g of pure water was separately prepared, and 0.5 g of 9.1% (normal) tetramethylammonium hydroxide was added thereto, followed by heating to 98° C. to the point of reflux. A 3% silicic acid aqueous solution prepared in the manner as described above was added dropwise under reflux at a temperature of 98° C. at an addition speed of 3.75 g/min over 108 minutes, and refluxed for 30 minutes. 9.0 g of 9.1% (normal) tetramethylammonium hydroxide was then added dropwise, and refluxed for 30 minutes. Subsequently, 675 g of the 3% silicic acid aqueous solution was added over 3 hours, during which 2.36 g of a 9.1% tetramethylammonium hydroxide aqueous solution was added dropwise every one hour. The operation of adding a 3% silicic acid aqueous solution containing acetic acid and a 9.1% tetramethylammonium hydroxide aqueous solution dropwise over 3 hours was performed one time, and the operation of adding a 3% silicic acid aqueous solution free of acetic acid and a 9.1% tetramethylammonium hydroxide aqueous solution dropwise over 3 hours was performed eight times, thereby preparing colloidal silica 7.

The prepared colloidal silica 7 was heated at 98° C. to concentrate it to a silica concentration of 20%, thereby preparing a concentrated liquid of colloidal silica. 0.3 g of acetic acid and 100 g of hexamethyldisilazane were added to 1000 g of the concentrated liquid of colloidal silica, and stirred. The temperature was increased from room temperature to 80° C. over 2 hours; and the mixture was further heated at 80° C. for 1 hour, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Comparative Example 1

266 g of pure water, 2166 g of methanol, and 62 g of 28% ammonia water were weighed and placed in a flask; and mixed with stirring, thereby preparing a mother liquor. Liquid A formed from 2634 g of tetraorthosilicate and 715 g of methanol, and liquid B formed from 1305 g of pure water and 144 g of 28% ammonia water were separately prepared; and these liquids were added to the mother liquor heated to 20° C. over 150 minutes, thereby obtaining a silica sol.

The prepared colloidal silica was heated at 98° C. to concentrate it to a silica concentration of 20%, thereby preparing a concentrated liquid of colloidal silica. 0.3 g of acetic acid, 111 g of acetone, and 140 g of hexamethyldisilazane were added to 1000 g of the concentrated liquid of colloidal silica, and stirred. The temperature was increased from room temperature to 80° C. over 2 hours, and the mixture was further heated at 80° C. for 5 hours, thereby preparing a hydrophobic silica reaction mixture. The hydrophobic silica reaction mixture was dried at 130° C., and pulverized with a jet mill, thereby preparing a hydrophobic silica powder. Table 1 illustrates the physical properties of the obtained hydrophobic silica powder.

Calculation of Volume Average Particle Size 100 or more of the primary particles of the obtained hydrophobic silica powder were observed with a scanning electron microscope (SEM), and the 50% size (D50v) at the cumulative frequency of equivalent circle diameter determined by an image analysis of the primary particles was calculated.

Measurement of Hydrophobicity 50 mL of pure water was placed in a 200-mL beaker; and 0.2 g of a hydrophobic silica powder was added thereto, followed by stirring with a magnet stirrer. The tip of a burette containing methanol was inserted into the liquid, and methanol was added dropwise with stirring. The amount of methanol required to completely disperse the hydrophobic silica powder in water was determined as Y mL, and the hydrophobicity was calculated using the following equation.

Hydrophobicity={$Y/(50+Y)$}×100

Nitrogen Content

Measurement by an elemental analysis was performed with a Sumigraph NCH-22F (Sumika Chemical Analysis Service, Ltd.) under the following conditions, thereby determining the nitrogen content in a hydrophobic silica powder.

Oxygen circulating combustion
TCD detection method
NCH quantification device
Reaction temperature: 850° C.
Reduction temperature: 600° C.
Separation/detection: a column packed with porous polymer beads/TCD
Reference sample: a reference sample for element quantification acetanilide Measurement of Saturated Water Content A hydrophobic silica powder was dried in a vacuum for 2 hours; and 2 g of the obtained hydrophobic silica powder was precisely weighed and placed in a Petri dish, followed by pretreatment at 60° C. and 80% RH for 48 hours. Thereafter, titration was performed for 10 minutes with an ADP-611 moisture vaporizer (Kyoto Electronics Manufacturing Co., Ltd.) and a MKV-710 Karl Fischer moisture meter (Kyoto Electronics Manufacturing Co., Ltd.), and the average of two measurements was determined to be the saturated water content.

Measurement of $^{29}$Si Solid-State NMR Spectrum

A $^{29}$Si solid-state NMR spectrum was measured with JNM-ECA400 (JEOL Ltd.) under the following conditions.
Resonant frequency: 78.65 Hz
Measurement mode: CP/MAS method
Nuclear for measurement: $^{29}$Si
Sample rotation frequency: 6 kHz
Measurement temperature: room temperature
Cumulated number: 16384 times From the spectra obtained under the conditions above, the peak intensity ratio of each structure Q (Q2: 91 to −92 ppm, Q3: −101 ppm, Q4: −111 ppm) was determined. Additionally, whether structure M derived from the trimethylsilyl group was present was confirmed.

Evaluation Test for Charging Properties of Toner Resin Particles

The hydrophobic silica powders of Examples 1 and 2 and Comparative Example 1 were externally added in a ratio of 100:2 (toner resin:hydrophobic silica powder). 10 g of each of the obtained products was weighed and placed in a 100-mL IBOY wide-mouth bottle (a polypropylene bottle with a volume of 100 mL), and subjected to pretreatment at 23° C. and 53% RH for 24 hours. Subsequently, the charge level was measured three times in a room adjusted to 20 to 25° C. and 50 to 60% RH, and the average was calculated.

Number of Twisted and/or Branched Particles

The number of particles that have a twisted structure and/or branched structure among the particles in a visual field observed with a scanning electron microscope (SEM, JEOL Ltd.: JSM-6700) at 200,000-fold magnification was counted, and the ratio of the particles was calculated and determined as "content (%)." The twisted structure refers to the structure of a secondary particle formed of at least 3 primary particles bound to each other in a line, but not in a straight line. The branched structure refers to the structure of a secondary particle formed of at least 4 primary particles that are bound to each other, but not in a line (branched).

Results of Measurements and Evaluation Test

The middle value in the chemical shift in a $^{29}$Si solid-state NMR spectrum of each hydrophobic silica powder of Examples 1 to 6 and Comparative Example 1 was at 12 ppm, indicating the presence of the trimethylsilyl group. As illustrated in Table 1, the toner resin particles obtained using the hydrophobic silica powders of Examples 1 to 6 as an external additive have excellent charge properties, compared with the toner resin particles obtained using the silica powder of Comparative Example 1 as an external additive.

TABLE 1

|  | Mean Particle Size (D50v) | Hydrophobicity (%) | N Content (%) | Saturated Water Content (%) | NMR | | | Charging Level (μC/g) | Number of Twisted/Branched Particles (%) |
| --- | --- | --- | --- | --- | --- | --- | --- | --- | --- |
|  |  |  |  |  | Q2 | Q3 | Q4 |  |  |
| Example 1 | 46 | 80 | 0.16 | 3.1 | 2 | 48 | 49 | 44 | 46 |
| Example 2 | 51 | 81 | 0.14 | 2.4 | 2 | 46 | 52 | 45 | 52 |
| Example 3 | 64 | 74 | 0.14 | 2.1 | 2 | 48 | 50 | 30 | 39 |
| Example 4 | 88 | 77 | 0.14 | 2.7 | 2 | 47 | 51 | 35 | 54 |
| Example 5 | 92 | 73 | 0.10 | 1.4 | 2 | 46 | 53 | 26 | 84 |
| Example 6 | 156 | 78 | 0.46 | 1.9 | 2 | 49 | 49 | 28 | 34 |
| Comparative Example 1 | 75 | 74 | 0.10 | 6.8 | 5 | 60 | 35 | 21 | 21 |

The invention claimed is:

1. A hydrophobic silica powder that has a hydrophobicity of 50% or more, a saturated water content of 4% or less, and a nitrogen content of 0.05% or more, wherein a peak derived from structure Q4 is present in an amount of 40% or more based on the total peaks derived from structure Q2, structure Q3, and structure Q4 in terms of peak intensity ratio in a $^{29}$Si solid-state NMR spectrum.

2. The hydrophobic silica powder according to claim 1, wherein a peak derived from structure M is present in a $^{29}$Si solid-state NMR spectrum.

3. The hydrophobic silica powder according to claim 1, comprising an amine having a boiling point of 100° C. or more in an amount of 0.1% or more.

4. A toner resin particle having the hydrophobic silica powder according to claim 1 externally added thereto.

* * * * *